United States Patent

Springer et al.

[11] Patent Number: 4,782,150
[45] Date of Patent: Nov. 1, 1988

[54] WATER-SOLUBLE TRIPHENDIOXAZINE COMPOUNDS

[75] Inventors: Hartmut Springer, Königstein/Taunus; Walter Helmling, Hofheim am Taunus; Günther Schwaiger, Frankfurt am Main, all of Fed. Rep. of Germany

[73] Assignee: Hoechst Aktiengesellschaft, Frankfurt am Main, Fed. Rep. of Germany

[21] Appl. No.: 84,427

[22] Filed: Aug. 11, 1987

[30] Foreign Application Priority Data

Aug. 13, 1986 [DE] Fed. Rep. of Germany ....... 3627458

[51] Int. Cl.⁴ .................... C07D 498/04; C09B 19/00; C09B 19/02
[52] U.S. Cl. ........................ 544/77; 544/75; 564/48; 564/185
[58] Field of Search .................. 544/75, 77

[56] References Cited

U.S. PATENT DOCUMENTS

| | | | |
|---|---|---|---|
| 4,621,138 | 11/1986 | Jäger et al. | 544/76 |
| 4,629,788 | 12/1986 | Jäger | 544/76 |
| 4,665,179 | 5/1987 | Wunderlich et al. | 544/76 |

FOREIGN PATENT DOCUMENTS

| | | |
|---|---|---|
| 0141996 | 5/1985 | European Pat. Off. . |
| 0144580 | 6/1985 | European Pat. Off. . |
| 3439755 | 10/1985 | Fed. Rep. of Germany . |

*Primary Examiner*—Richard L. Raymond

[57] ABSTRACT

Water-soluble triphendioxazine compounds which have valuable fiber-reactive dyestuff properties and correspond to the general formula (1) and dye materials, in particular cellulose fiber materials, containing carboxamide and/or hydroxy groups in fast shades.

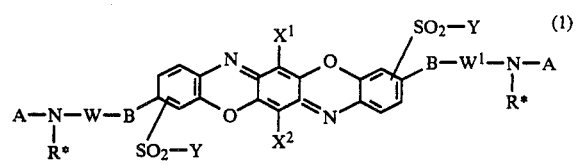

in which:

B is a group —O—, —S—, —NH— or —N(R')— in which R' is alkyl having 1 to 6 carbon atoms;

R* is hydrogen or optionally substituted lower alkyl or optionally substituted aryl;

W and W¹ independently of one another are each a divalent aliphatic radical or a cycloaliphatic radical which is optionally substituted by lower alkyl or an aliphatic-cycloaliphatic radical which is optionally substituted by lower alkyl, it being possible for the aliphatic radicals to be interrupted by one or more groups —O—, —S—, —SO₂—, —CO—, 1,4-piperidino, —NH— and —N(R⁰)— in which R⁰ has the meaning of R' or is lower alkanoyl;

the groupings —B—W¹—N(R*)— and —N(R*)—W—B 13 independently of one another each represent the divalent radical of a five-membered or six-membered, saturated heterocyclic structure containing two N atoms, or the groupings —B—W¹— and —W—B— independently of one another each represent the divalent radical of a five-membered or six-membered, saturated heterocyclic structure which contains two N atoms and which is attached by means of one of the two N atoms, via a C₂–C₄-alkylene, to the groupings —N(R*)—A or A—N(R*)—, respectively;

is benzoyl, naphthoyl, N-phenylcarbamoyl or N-naphthylcarbamoyl in which the phenyl and naphthyl radicals can be substituted, at least one of these being a group which imparts solubility in water;

X¹ and X² independently of one another are each hydrogen, halogen, lower alkyl, lower alkoxy or optionally substituted aryl;

Y is vinyl or a β-substituted ethyl;

and the compounds necessarily contain at least two sulfo groups.

18 Claims, No Drawings

WATER-SOLUBLE TRIPHENDIOXAZINE COMPOUNDS

The present invention relates to the field of fiber-reactive dyestuffs.

Fiber-reactive triphendioxazine dyestuffs are disclosed in European Patent Application Publication No. 0,141,996 A, but these dyestuffs have properties which are still in need of improvement.

New water-soluble triphendioxazine compounds which correspond to the general formula (1)

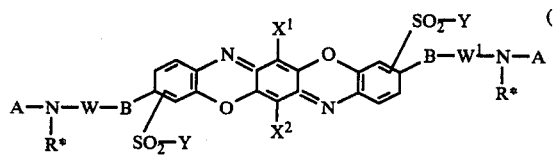

which have valuable fiber-reactive dyestuff properties have now been found.

In this formula (1),

B is an oxygen or sulfur atom or an amino group of the formula —NH— or —N(R')— in which R' is an alkyl group having 1 to 6 carbon atoms, preferably 1 to 4 carbon atoms, such as the methyl or ethyl group;

R* is a hydrogen atom or an optionally substituted alkyl group having 1 to 4 carbon atoms or an optionally substituted aryl radical, such as, for example, methyl, ethyl, benzyl, phenethyl, β-sulfatoethyl, β-sulfoethyl, phenyl, sulfophenyl or sulfobenzyl;

W is a divalent, aliphatic radical or a ($C_5$-$C_{10}$)-cycloaliphatic radical which is optionally substituted by alkyl having 1 to 4 carbon atoms, or an aliphatic-($C_5$-$C_8$)-cycloaliphatic radical which is optionally substituted in the cycloaliphatic moiety by alkyl having 1 to 4 carbon atoms, it being possible for the aliphatic radicals to be interrupted by hetero groups, preferably 1 or 2 hetero groups, selected from the groups —O—, —S—, —$SO_2$—, —CO—, 1,4-piperidino, —NH— and —N($R^o$)— in which $R^o$ has one of the meanings of R' or is an alkanoyl group having 2 to 5 carbon atoms, such as the acetyl group, and $W^1$ has one of the meanings indicated for W and is identical with or different from W, or the grouping —B—$W^1$—N(R*)— and the grouping —N(R*)—W—B—, which are identical with or different from one another, each, as a group, represent the divalent radical of a five-membered or six-membered saturated heterocyclic structure containing two nitrogen atoms, or the grouping —B—$W^1$— and the grouping —W—B—, which are identical with or different from one another, each, as a group, represent the divalent radical of a five-membered or six-membered saturated heterocyclic structure which contains two nitrogen atoms and which is attached by means of one of the two nitrogen atoms, via an alkylene group having 2 to 4 carbon atoms, to the grouping —N(R*)—A or A—N(R*)—, respectively;

A is a radical of the general formula (2a) or (2b)

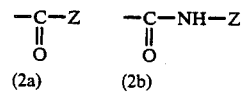

in which Z is a phenyl radical or a naphthyl radical, both of which are substituted, for example by alkyl having 1 to 4 carbon atoms, alkoxy having 1 to 4 carbon atoms, chlorine, bromine, nitro, carbalkoxy having 2 to 5 carbon atoms, sulfo and carboxy, at least one of these substituents being a group imparting solubility in water, such as a sulfo or carboxy group;

$X^1$ is a hydrogen atom or a halogen atom, such as a chlorine or bromine atom, an alkyl group having 1 to 4 carbon atoms, an alkoxy group having 1 to 4 carbon atoms or an optionally substituted aryl radical;

$X^2$ is identical with or different from $X^1$ and has one of the meanings indicated for $X^1$;

Y is the vinyl group or an ethyl group containing, in the β-position, a substituent which can be eliminated by means of an alkali, and the group —$SO_2$—Y is preferably attached in the ortho-position relative to the group —B—W—N(R*)—A or A—N(R*)—W—B—, and the molecule (1) contains at least two of the sulfo groups which can be present in the molecule (1).

The individual formula members which appear twice can have meanings identical with one another or different from one another; preferably they have meanings identical with one another, and the compounds (1) are therefore preferably compounds of a symmetrical structure.

Aliphatic radicals are preferably linear or branched alkylene groups having 1 to 6 carbon atoms. Examples of substituted alkyl groups are those which can be substituted by 1 or 2 substituents belonging to the group comprising chlorine, alkoxy having 1 to 4 carbon atoms, benzoylamino, sulfobenzoylamino, alkanoylamino having 2 to 5 carbon atoms, hydroxy sulfato, phosphato, alkanoyloxy having 2 to 5 carbon atoms, sulfo, carboxy or optionally substituted aryl. Of these, preferred substituents are the carboxy and sulfo groups and also sulfato groups.

Aryl radicals in the groups mentioned above or below are especially the phenyl and naphthyl radicals; they can be substituted, for example by substituents belonging to the group comprising alkyl having 1 to 4 carbon atoms, such as methyl and ethyl, alkoxy having 1 to 4 carbon atoms, such as methoxy and ethoxy, halogen, such as chlorine and bromine, sulfo, carboxy, nitro, sulfamoyl and carbamoyl (it being possible for sulfamoyl and carbamoyl to be monosubstituted or disubstituted by optionally substituted alkyl having 1 to 4 carbon atoms and/or optionally substituted aryl).

W or $W^1$ is preferably an alkylene of 2 to 6, preferably of 2 to 4 carbon atoms or, if it is interrupted by one or two hetero groups, an alkylene of 2 to 8, preferably 2 to 6, especially 2 to 4, carbon atoms, the hetero group in the alkylene radical being preferably an oxygen atom or a group —NH—. W or $W^1$ are also, for example, cycloalkylene groups having 5 or 6 carbon atoms and being unsubstituted or substituted by 1, 2 or 3 methyl groups, or are two such cycloalkylene groups linked with one another via an alkylene of 1 to 4 carbon atoms, or are an alkylene of 2 to 6 carbon atoms which is interrupted by a cycloalkylene group of this type.

Examples of radicals $W^1$ are the 1,2-ethylene, 1,3-propylene, 1,4-butylene, 1,5-pentylene, 1,6-hexylene, 2-methyl-1,3-propylene, 1,2-dimethyl-1,2-ethylene, 1,3-dimethyl-1,3-propylene, 2,2-dimethyl-1,3-propylene or 1,2-, 1,4- and 1,3-cyclohexylene radical or a divalent radical of the formulae (a) to (s) indicated below, of which the 1,2-ethylene, 1,3-propylene and 1,4-butylene radical and the radical of the formula (a) are preferred:

$$-CH_2-CH- \quad -CH_2-CH- \quad -CH_2-CH_2-CH-$$
$$\phantom{-CH_2-}CH_3 \phantom{xx} \phantom{-CH_2-}C_2H_5 \phantom{xxxxxxxx} CH_3$$
(a) \qquad\qquad (b) \qquad\qquad (c)

$$-(CH_2)_4-CH- \quad -CH_2-CH_2-O-CH_2-CH_2-$$
$$\phantom{-(CH_2)_4-}CH_3$$
(d) \qquad\qquad\qquad (e)

$$-CH_2-CH_2-S-CH_2-CH_2-$$
(f)

$$-CH_2-CH_2-SO_2-CH_2-CH_2-$$
(g)

$$-(CH_2)_3-O-CH_2-CH_2-O-(CH_2)_3-$$
(h)

$$-CH_2-CH_2-NH-CH_2-CH_2-$$
(j)

$$-CH_2-CH_2-N-CH_2-CH_2-$$
$$\phantom{-CH_2-CH_2-}CH_3$$
(k)

$$-CH_2-CH_2-N-CH_2-CH_2-$$
$$\phantom{-CH_2-CH_2-}CO-CH_3$$
(m)

[structure with norbornane-like ring: $-CH_2-\langle\rangle-CH_2-$]
(n)

[structure: cyclohexane–CH₂–cyclohexane with H substituents]
(p)

[structure: $-CH_2-\text{cyclohexane(H)}-CH_2-N\langle\text{piperazine}\rangle N-CH_2-$]
(r) \qquad\qquad (s)

The radicals W are, for example, those groups mentioned above for $W^1$, but having a "mirror image" structure.

An example of heterocyclic groupings which can be formed jointly from the radicals $-B-W^1-N(R^*)-$ or $-N(R^*)-W-B-$ is the divalent 1,4-piperidino radical. An example of groupings containing heterocyclic radicals which can be formed jointly from the radicals $-B-W^1-$ is the radical of the formula (t)

$$-N\begin{array}{c}CH_2-CH_2\\ \\CH_2-CH_2\end{array}N-CH_2-CH_2-.$$
(t)

An example of groupings containing heterocyclic radicals which can be formed jointly from the radical $-W-B-$ is a radical of the formula (u)

$$-CH_2-CH_2-N\begin{array}{c}CH_2-CH_2\\ \\CH_2-CH_2\end{array}N-.$$
(u)

Preferably, B also denotes the group NH and R* denotes a hydrogen atom.

In the general formulae (2a) and (2b), the radical Z is preferably a group of the formula (3a) or (3b)

[structure (3a): benzene ring with $R^1$, $R^2$, and $(SO_3M)_a$ substituents]

[structure (3b): naphthalene ring with $R^1$ and $(SO_3M)_b$ substituents]

(3a) \qquad (3b)

in which

M is a hydrogen atom or an alkali metal, such as sodium, potassium and lithium, or the equivalent of an alkaline earth metal, such as, for example, calcium, but particularly an alkali metal, $R^1$ is a hydrogen atom, an alkyl group having 1 to 4 carbon atoms, such as the ethyl group and especially the methyl group, an alkoxy group having 1 to 4 carbon atoms, such as the ethoxy group and especially the methoxy group, a chlorine or bromine atom, a nitro group, a carbalkoxy group having 2 to 5 carbon atoms, such as the carbomethoxy or carbethoxy group, or a sulfo group, and $R^2$ denotes a hydrogen atom, an alkyl group having 1 to 4 carbon atoms, such as the ethyl group and especially the methyl group, an alkoxy group having 1 to 4 carbon atoms, such as the ethoxy group and especially the methoxy group, a chlorine atom, a carboxy group or a sulfo group, a represents the number zero or 1, it being necessary for a to be 1 if $R^1$ or $R^2$ does not denote any of the indicated groups imparting solubility in water, and b denotes the number zero, 1 or 2, it being necessary for b to be the number 1 or 2, if $R^1$ does not represent any of the mentioned groups imparting solubility in water.

If a or b represents the number zero, this group denotes a hydrogen atom.

The radicals $X^1$ and $X^2$, which are identical with one another or different from one another, are preferably identical with one another; preferably they are hydrogen or, in particular, halogen, such as bromine and in particular chlorine.

R¹ is preferably a hydrogen atom, the methyl, ethyl, methoxy, ethoxy or sulfo group or a chlorine or bromine atom. R² is preferably a hydrogen atom, the methoxy, ethoxy, carboxy or sulfo group or a chlorine atom, and a is preferably the number 1 and b is preferably the number 1 or 2.

The following of the groups Z should be singled out particularly: a naphth-2-yl radical which is substituted by 1, 2 or 3 sulfo groups, a phenyl radical which is substituted by 1 bromine atom and 1 or 2 sulfo groups, a phenyl radical which is substituted by 1 or 2 ethoxy groups and 1 or 2 sulfo groups, a naphth-2-yl radical which is substituted by 1 chlorine atom and 1, 2 or 3 sulfo groups, a phenyl radical which is substituted by 1 or 2 carboxy groups, but particularly a phenyl radical which is substituted by 1 or 2 sulfo groups, a naphth-1-yl radical which is substituted by 1, 2 or 3 sulfo groups, a phenyl radical which is substituted by 1 or 2 methyl groups and 1 or 2 sulfo groups, a phenyl radical which is substituted by 1 or 2 chlorine atoms and 1 or 2 sulfo groups, and a phenyl radical which is substituted by 1 or 2 methoxy groups and 1 or 2 sulfo groups, the number of substituents in the substituted phenyl radicals being not greater than three.

In the preceding and following text sulfo groups are groups corresponding to the general formula —SO₃M, carboxy groups are groups corresponding to the general formula —COOM, sulfato groups are groups corresponding to the general formula —OSO₃M, thiosulfato groups are groups corresponding to the general formula —S—SO₃M and phospato groups are groups corresponding to the general formula —OPO₃M₂, M having in each case the meaning indicated above.

X represents a bromine atom or, particularly preferably, a chlorine atom,

M has the meaning mentioned above and is preferably an alkali metal and both of the A's denote a group of the abovementioned formula (2a) or (2b) in which the group Z's, in each case identical with one another or different from one another, denote a group of the general formula (3c)

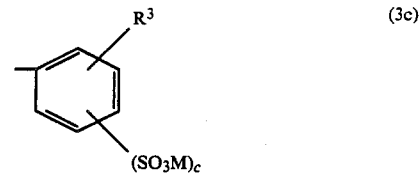

in which

R³ denotes the methyl, ethyl, methoxy or ethoxy group or a sulfo group or a chlorine or bromine atom, and c represents the number zero, 1 or 2, it being necessary for c to be the number 1 or 2 if R³ does not denote a sulfo group.

Preferred compounds of these compounds of the general formula (1a) are especially those in which both of the X's represent a chlorine atom, W and W¹ both denote the 1,2-ethylene radical and both of the A's each represent a group of the formula (2a) or (2b) in which Z is in each case a sulfophenyl group.

The present invention also relates to processes for the preparation of the compounds of the general formula (1) mentioned above and defined. These processes comprise cyclizing, in an acid medium and preferably in the presence of an oxidizing agent, a compound of the general formula (4)

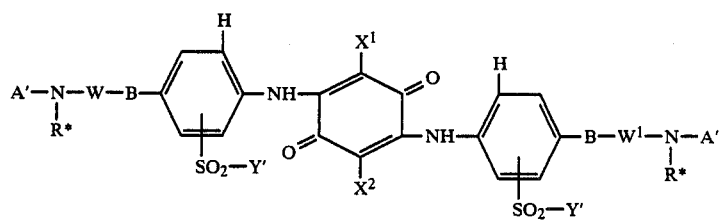

The new dioxazine compounds can exist either in the acid form or in the form of their salts. They are preferably in the form of their alkali metal salts and are also preferably used in the form of these salts for dyeing (understood in the general sense and including printing) materials, in particular fiber materials, containing hydroxy and/or carboxamide groups.

Preferred triphendioxazine compounds according to the invention are those of the general formula (1a)

in which

W and W¹ both denote an alkylene group having 2 to 6 carbon atoms, preferably 2 to 4 carbon atoms, each, (in which Y' is the vinyl group, the β-hydroxyethyl group or an ethyl group containing, in the β-position, a substituent which can be eliminated by means of an alkali, such as one of the substituents mentioned for Y, and is preferably the β-hydroxyethyl group, A' has the meaning of A, but the groups Z do not necessarily have substituents, also do not necessarily have substituents which impart solubility in water, and B, R*, W, W¹, X¹ and X² have the abovementioned meanings, and substituted alkyl groups in these radicals can also be hydroxy-substituted alkyl groups, the groups —SO₂—Y' are preferably attached in the ortho-position relative to the group B and the benzene nuclei must not be substituted in one of the ortho-positions relative to the indicated amino group —NH—) to give the triphendioxazine. The reaction is carried out by a procedure which is known per se, for example in sulfuric acid or sulfuric acid containing sulfur trioxide as the reaction medium, the oxidizing agent used being sulfur trioxide, ammonium or alkali metal persulfates, iodine or inorganic iodine compounds in the presence of oleum, sodium perborate, but preferably sodium or potassium peroxodisulfate (corresponding to the formulae $Na_2S_2O_8$, or $K_2S_2O_8$, respectively). Procedures of this type are disclosed, for example, in British Pat. No. 1,589,915 and in European Patent Application Publications Nos. 0,141,359A and 0,168,751A.

The cyclization is preferably carried out in concentrated sulfuric acid, such as 96% strength to, preferably, 100% strength sulfuric acid and especially in sulfuric acid containing sulfur trioxide (oleum), such as oleum of up to 50% strength by weight. The reaction temperature chosen is between 0° and 60° C. The oleum used as the reaction medium and agent as a rule contains 5 to 40% by weight, preferably 10 to 20% by weight, of sulfur trioxide. If peroxodisulfate is added as the oxidizing agent, the cyclization is carried out at between 0° and 40° C., preferably between 15° and 25° C. If oleum/peroxodisulfate is used, the reaction temperature should not exceed 30° C. 10 to 20% strength oleum, using a twice-molar amount of peroxodisulfate relative to the compound (4), is preferred. If iodine is used as the oxidizing agent, it is employed in catalytic amounts in 10 to 50% strength oleum; in this case the reaction temperature is as a rule between 0° and 40° C.

At the same time as the cyclization, or only after the cyclization reaction, it is possible to esterify hydroxyalkyl groups which may be present, such as, for example, the β-hydroxyethyl group of the radical Y', by means of a sulfating or phosphating agent, such as 96-100% strength sulfuric acid or sulfuric acid containing sulfur trioxide, or polyphosphoric acid, to give the corresponding sulfatoalkyl groups or phosphatoalkyl groups, respectively. Thus, if the cyclization is carried out in sulfuric acid or oleum as the reaction medium, hydroxy groups which are attached to an alkyl radical of the molecule, such as, for example, the β-hydroxyethyl groups of the radical Y' already mentioned above or hydroxyalkyl groups in the radicals R*, W and $W^1$, are converted into the corresponding sulfatoalkyl groups.

At cyclization temperatures above 15° C., especially above 25° C., it is also possible, in accordance with the invention, to introduce sulfo groups into the aromatic rings of the aryl radicals of R*, $X^1$, $X^2$ and Z by means of 100% strength sulfuric acid or oleum. The sulfonation reaction can, however, also be carried out after the cyclization, if appropriate in a separate reaction stage with the isolated cyclization product (triphendioxazine). In this case the sulfonation reaction is carried out, as a rule, at between 20° and 80° C., preferably between 30° and 70° C.

The simultaneous or subsequent sulfonation reaction is a particularly advantageous variant of the process according to the invention. In this procedure according to the invention triphendioxazine compounds of the general formula (1) are obtained in the form of a mixture containing a varying number of sulfo groups.

Compounds of the formula (1) in which Y is a β-sulfatoethyl group can subsequently be converted, analogously to known procedures, into other compounds, according to the invention, of the formula (1) in which the Y's represent vinyl groups or ethyl groups having another substituent located in the β-position which can be eliminated by means of alkali.

The starting compounds of the general formula (4) can be prepared, in a manner also in accordance with the invention, by reacting a compound of the general formula (5)

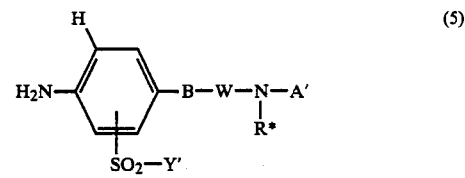

(in which W also represents $W^1$ and Y' has the abovementioned meaning and is preferably the β-hydroxyethyl group and R* and A' have the abovementioned meanings, it being also possible for substituted alkyl groups in these radicals to be hydroxy-substituted alkyl groups and for aryl radicals also to be free from sulfo groups, and the groups —$SO_2$—Y' being preferably attached in the orthoposition relative to the group B) with a 1,4-benzoquinone compound of the general formula (6)

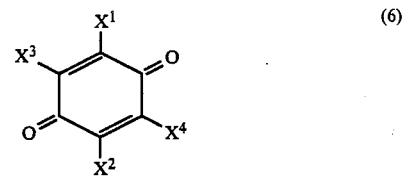

in which $X^1$ and $X^2$ have the abovementioned meanings and $X^3$ and $X^4$ are identical with one another or different from one another and each represents a hydrogen atom, an alkoxy group having 1 to 4 carbon atoms, such as especially the methoxy group, or a phenoxy group, or is preferably a halogen atom, such as a fluorine atom, especially a bromine atom and particularly a chlorine atom, it being also possible for $X^3$ and $X^4$ to have the same meaning as $X^1$ and $X^2$.

The reaction of a compound of the general formula (5) or of two different amino compounds of the general formula (5), each in an amount which together is twice equivalent, with one equivalent of a compound of the general formula (6) to give the compound of the general formula (4) is carried out analogously to known procedures, which are mentioned and described, for example, in European Patent Application Publications Nos. 0,141,996A and 0,168,751A. For example, the reaction can be carried out in an aqueous medium or in an aqueous organic medium or in a wholly organic medium, the organic solvents being polar, aprotic and protic solvents, such as, for example, lower alkanols, such as methanol and ethanol, and halogenated benzenes, such as o-dichlorobenzene. It is preferable, however, to employ the quinone (6) in a fairly large excess of varying extent which is, as a rule, 5-20%, but can also, depending on the quinone selected, be up to 100% or higher. The reaction of the amines (5) with the quinones (6) can be carried out at a temperature between 20° and 100° C., preferably between 50° and 70° C., in the presence of an acid-binding agent, such as, for example, an alkali metal carbonate or acetate or an alkaline earth metal carbonate or acetate, for example sodium acetate, sodium carbonate or sodium bicarbonate, or an alkali or alkali metal hydroxide, such as sodium hydroxide, or an oxide of an alkaline earth metal, such as, for example, magnesium oxide. If the reaction is carried out in an aqueous or aqueous organic medium, the pH is adjusted to a range between 4 and 7, preferably between 5.5 and 6.5.

The aniline starting compounds of the general formula (5) have not been known until now. The invention therefore also relates to these compounds, to processes for their preparation and to their use for the synthesis of dyestuffs. They can be prepared analogously to known procedures for reacting amino compounds with acid chlorides or isocyanates, for example, in accordance with the invention, by reacting an amino compound of the general formula (7)

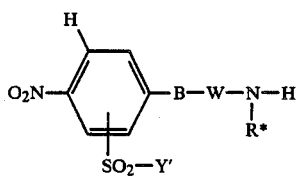
(7)

in which Y', B, W and R* have the meanings mentioned above, with a compound corresponding to one of the formulae (8A), (8B) and (8C) mentioned and defined in the claims, preferably with a compound of the general formula (8a), (8b) or (8c) and/or (9a) or (9b)

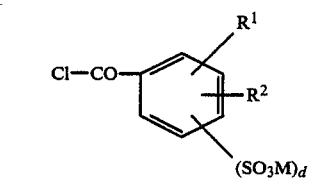
(8a)

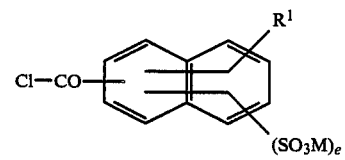
(8b)

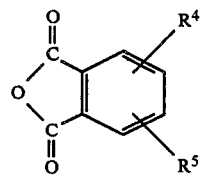
(8c)

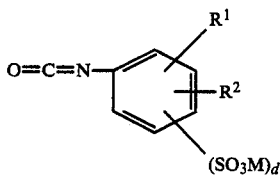
(9a)

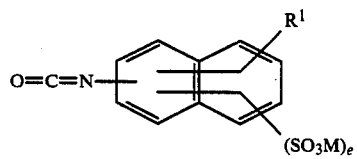
(9b)

in which $R^1$ and $R^2$ have the meanings mentioned above, d represents the number zero, 1 or 2, e denotes the number zero, 1, 2 or 3, $R^4$ is a hydrogen atom, an alkyl group having 1 to 4 carbon atoms, such as the ethyl group and especially the methyl group, an alkoxy group having 1 to 4 carbon atoms, such as the ethoxy group and especially the methoxy group, a chlorine or bromine atom or a nitro group, and $R^5$ is a hydrogen atom, an alkyl group having 1 to 4 carbon atoms, such as the ethyl group and especially the methyl group, an alkoxy group having 1 to 4 carbon atoms, such as the ethoxy group and especially the methoxy group, or a chlorine atom, and subsequently reducing the nitro group.

The reaction of the compounds of the general formula (7) with the compounds (8) or (9) is carried out according to the procedures described in the literature for this type of reaction, for example in an aqueous medium or in an organic medium which is customary for this type of reaction, such as an alkanol having 1 to 6 carbon atoms, such as, in particular, methanol or ethanol, acetone, methyl ethyl ketone, dioxane, N,N-dimethylformamide, N-methyl-2-pyrrolidone or toluene or a mixture of water and a water-miscible organic solvent, at a temperature between 0° and 60° C. and, if the reaction is carried out in an aqueous or aqueous organic medium, at a pH between 3 and 12. It is advantageous to add a customary acid-binding agent in the reaction of the compounds (7) with the compounds (8), in order to bind the hydrogen chloride liberated.

Examples of carboxylic acid chlorides of the general formula (8) are benzoyl chloride, 4-methoxybenzoyl chloride, 2-methyl-, 3-methyl- and 4-methyl-benzoyl chloride, 4-chlorobenzoyl chloride, 3-chlorobenzoyl chloride, 2-chlorobenzoyl chloride, 4-bromobenzoyl chloride, 3-bromobenzoyl chloride, 4-nitrobenzoyl chloride, naphthalene-1-carboxylic acid chloride, naphthalene-2-carboxylic acid chloride, 2,5-dichlorobenzoyl chloride, 2,4-dichlorobenzoyl chloride, 3,4-dichlorobenzoyl chloride, 2-methoxybenzoyl chloride, 3-methoxybenzoyl chloride and 2-nitro-4-methylbenzoyl chloride.

Examples of isocyanates of the general formula (9) are phenyl isocyanate, 4-chlorophenyl isocyanate, 3-methylphenyl isocyanate, 3,5-dimethylphenyl isocyanate, 2-methylphenyl isocyanate, 3-chlorophenyl isocyanate, 3,5-dichlorophenyl isocyanate, 2,3-dichlorophenyl isocyanate, 3-chloro-4-methylphenyl isocyanate, 1-naphthyl isocyanate and 4-isopropylphenyl isocyanate.

It can be seen from the above exemplary information that it is preferable to use as starting materials compounds which are not substituted by a sulfo group in the aromatic radical, since the introduction of one (or more) sulfo groups into the aromatic radicals is preferably and, as far as the process is concerned, more advantageously effected during or after the cyclization reaction, leading to the triphendioxazine skeleton, by means of sulfuric acid containing sulfur trioxide or 100% strength sulfuric acid, as indicated above.

The nitro compounds which are obtained from the reactions of the compounds (7) with the compounds (8) or (9) and which correspond to a general formula (10)

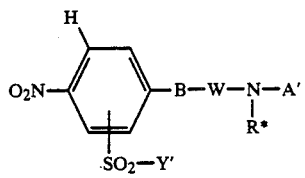

(10)

in which Y', B, W, R* and A' have the meanings mentioned above, can then be converted into the compound of the general formula (5) by methods which are customary per se for the reduction of aromatic nitro groups by means of hydrogen over a metal catalyst, such as a palladium, platinum or Raney nickel castalyst, under pressure in an autoclave, or by means of the Béchamp reduction using iron turnings.

The starting compounds corresponding to the general formula (7) are known or can be prepared analogously to known processes in a manner customary per se, such as, for example, in accordance with the directions of German Offenlegungsschrift No. 3,502,991.

The following are examples of starting compounds of the general formula (5): 3-(β-hydroxyethylsulfonyl)-4-N-(β-benzoylaminoethyl)aminoaniline, 3-(β-hydroxyethylsulfonyl)-4-N-(γ-benzoylaminopropyl)-aminoaniline, 3-(β-hydroxyethylsulfonyl)-4-N-(β-benzoylaminopropyl)-aminoaniline, 3-(β-hydroxyethylsulfonyl)-4-N-[β-(2'-, 3'- or 4'-methylbenzoylamino)-ethylamino]-aniline, 3-(β-hydroxyethylsulfonyl)-4-N-[β-(4'-chlorobenzoylamino)-ethylamino]-aniline, 3-(β-hydroxyethylsulfonyl)-4-N-[β-(4'-methoxybenzoylamino)-ethylamino]-aniline, 3-(β-hydroxyethylsulfonyl)-4-N-[β-(2'-methoxybenzoylamino)-ethylamino]-aniline, 3-(β-hydroxyethylsulfonyl- 4-N-{β-[β'-(4'-methoxybenzoylamino)-ethoxy]-ethylamino}-aniline, 3-(β-hydroxyethylsulfonyl)-4-N-[β-(N'-phenylureido)-ethylamino]-aniline, 3-(β-hydroxyethylsulfonyl-4-N-[β-(N'-phenylureido)-propylamino]-aniline, 3-(β-hydroxyethylsulfonyl)-4-N-[β-(N'-3'-methylphenylureido)-propylamino]-aniline, 3-(β-hydroxyethylsulfonyl)-4-N-[γ-(N'-2'-methylphenylureido)-propylamino]-aniline, 3-(β-hydroxyethylsulfonyl)-4-N-{β-[β'-(N'-phenylureido)ethylsulfonyl]-ethylamino}-aniline and 3-(β-hydroxyethylsulfonyl)-4-N-[β-(N'-naphthy-1'-yl-ureido)-ethylamino]-aniline.

The following are examples of the benzoquinones of the general formula (6) which are used as starting compounds: 2-methyl-3,5,6-tribromo-1,4-benzoquinone, 2-methoxy-3,5,6-trichloro-1,4-benzoquinone, 2,3,5,6-tetramethoxy-1,4-benzoquinone, 2,3,5,6-tetraphenoxy-1,4-benzoquinone, 2-methyl-3,6-dichloro-1,4-benzoquinone, 2,5-dichloro-1,4-benzoquinone and, preferably, 2,3,5,6-tetrabromo-1,4-benzoquinone and particularly 2,3,5,6-tetrachloro-1,4-benzoquinone (chloranil).

The separation and isolation of the compounds of the general formula (1), prepared in accordance with the invention, from the synthesis solutions can be effected by generally known methods, for example either by precipitation from the reaction medium by means of electrolytes, such as, for example, sodium chloride or potassium chloride, or by evaporation, for example spray-drying, of the reaction solution, it being possible to add a buffer substance to this reaction solution.

The compounds, according to the invention, of the general formula (1)—described below as compounds (1)—have fiber-reactive properties and possess valuable properties as dyestuffs. They can therefore be used for dyeing (including printing) natural, regenerated or synthetic materials containing hydroxy groups and/or carboxamide groups, for example materials in the form of sheet-like structures, such as paper and leather, or in bulk, composed of polyamide or polyurethane, but particularly materials of this type in fiber form, such as cellulose fiber materials, silk, wool and synthetic polyamide and polyurethane fibers. It is also possible to employ the solutions obtained in the synthesis of the compounds (1) without further treatment, but, if appropriate, after a buffer substance has been added or, if appropriate, after they have been concentrated, as a liquid preparation for tinctorial use.

In accordance with the use according to the invention, the compounds (1) can be applied and fixed to the substrates mentioned, in particular to the fiber materials mentioned, by the application techniques which are known for water-soluble dyestuffs, in particular fiber-reactive dyestuffs, for example by applying the compound (1) in a dissolved form to the substrate or introducing it into the latter, and fixing it on or in the latter, if appropriate by the action of heat and/or, if appropriate, by the action of an agent having an alkaline reaction. Numerous methods of dyeing and fixing of this type are described in the literature, for example also in European Patent Application Publication No. 0,168,751A.

The present invention therefore also relates to the use of the compounds (1) for dyeing (including printing) materials containing hydroxyl and/or carboxamide groups and to processes for their application to these substrates. The materials are preferably used in the form of fiber materials, especially in the form of textile fibers, such as yarns, wound packages and fabrics. In this respect it is possible to use processes analogous to known procedures for applying and fixing fiber-reactive dyestuffs.

The dyeings and prints produced by means of the compounds (1) are distinguished by clear, predominantly blue, color shades. The dyeings and prints on cellulose fiber materials in particular possess very great depths of color and also very good fastness properties to light, including good fastness properties to light under wet conditions and under perspiration, and also good fastness properties to hypochlorite bleaching and to chlorinated water, and also excellent fastness properties to wet processing, such as, for example, good fastness properties to washing at 60° to 95° C., even in the presence of perborates, good fastness properties to milling, cross-dyeing and perspiration (each acidic and alkaline), good fastness properties to alkalis, acids, water and seawater and also good fastness to pleating, hot ironing and rubbing. They also possess good fastness to wet storage and good fastness to storage under acid conditions ("acid fading") when moist dyed material still containing acetic acid is stored. Furthermore, the dyeings are stable to the customary synthetic resin finishes. Some of the compounds (1) are comparable with fiber-reactive anthraquinone dyestuffs in clarity of color shade and in important fastness properties.

The Examples below serve to illustrate the invention. Unless a note is made to the contrary, the parts are parts by weight and the percentages represent percentages by weight. Parts by weight are in the same relation to parts by volume as kilogram to liter.

The compounds described in terms of formulae in these Examples are shown in the form of the free acids; in general, they are prepared and isolated in the form of their sodium or potassium salts and are used for dyeing in the form of their salts. Similarly, the starting compounds and components mentioned in the form of the free acid in the Examples below, in particular the Tabular Examples, can be employed in the synthesis as such or in the form of their salts, preferably their alkali metal salts, such as sodium or potassium salts. The absorption maxima ($\lambda_{max}$ values) were determined in aqueous solution. The $^1$H-NMR measurements were carried out in $d_6$-dimethyl sulfoxide using tetramethylsilane as internal standard, unless otherwise indicated.

EXAMPLE 1

(a) 24 parts of triethylamine are added to a solution of 60 parts of 4-($\beta$-aminoethylamino)-3-($\beta$-hydroxyethylsulfonyl)-nitrobenzene in 150 parts of N-methyl-2-pyrrolidone, and 31 parts of benzoyl chloride are then added continuously, in the course of which the reaction temperature rises to 45° C. Stirring is continued for a further 3 hours and the mixture is then stirred onto 1,000 parts of ice water. After 2 hours the 4-($\beta$-benzoylaminoethylamino)-3-($\beta$-hydroxyethylsulfonyl)-nitrobenzene, which is obtained in a pure form and in a high yield, is filtered off with suction and dried; it has a melting point of 116°–118° C.

(b) 50 parts of the nitro compound obtained under (a) are dissolved in 250 parts of ethanol and are hydrogenated in the presence of a nickel catalyst in an autoclave at a temperature of up to 70° C. and a pressure of 50 bar. The hydrogenation takes about four hours. The catalyst is then filtered off and the filtrate is concentrated by distilling off the solvent. The desired compound of the formula

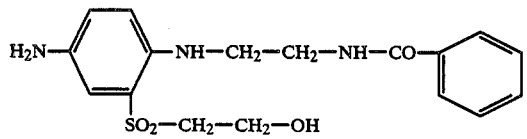

is obtained in the form of an oil.

(c) 77 parts of the 4-($\beta$-benzoylaminoethylamino)-3-($\beta$-hydroxyethylsulfonyl)-aniline synthesized under (b) are dissolved in a mixture of 700 parts of water and 300 parts of methanol; this solution is warmed to 60° C. and 27 parts of chloranil are introduced while the pH is kept at a value of 6 to 6.5 (for example by means of sodium bicarbonate). After stirring for a further 30 minutes, the precipitated condensation product is filtered off with suction, washed first with aqueous ethanol and then with water, and dried under reduced pressure at 80° C.

(d) 18 parts of the condensation product synthesized under (c) are introduced into 150 parts of 10% strength oleum at 20° C. The mixture is stirred until complete solution is achieved, and 10 parts of sodium peroxodisulfate are then added slowly while the temperature is maintained at 20° to 25° C. The mixture is stirred for a further hour and is then poured onto 500 parts of ice, and the precipitated product is filtered off with suction. The resulting triphendioxazine compound is stirred into 300 parts of water, the pH of the suspension is adjusted to a value of 6 with sodium carbonate, and the triphendioxazine compound is filtered off with suction again and dried.

(e) 20 parts of the triphendioxazine compound obtained under (d) of the formula

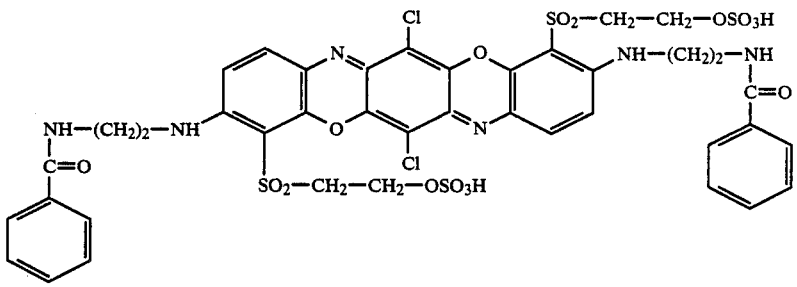

are introduced into 100 parts of 20% strength oleum, and the temperature is kept at 65° C. for 2 hours. After cooling, the batch is stirred onto 1,000 parts of ice and the precipitated product is filtered off with suction, stirred into 250 parts of water, and the pH of the solution is adjusted to a value of 6 with sodium carbonate; potassium chloride, in an amount of 25%, relative to the volume of the solution, is added, and the precipitated compound according to the invention is filtered off with suction and dried at 60° C. under reduced pressure.

The alkali metal salt according to the invention (predominantly potassium salt) of the compound of the formula

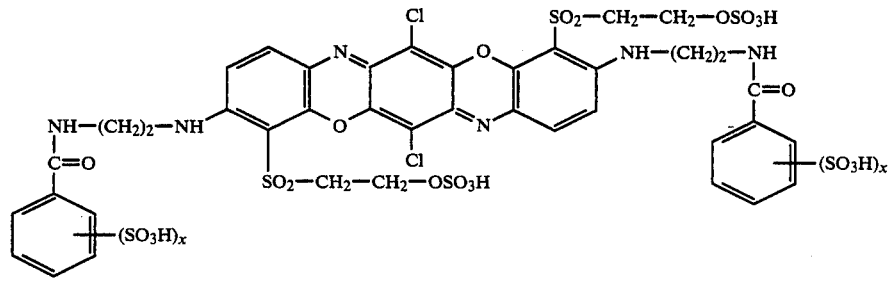

(in which x is intended to indicate a degree of sulfonation of approx. 1.2) is obtained in the form of a powder containing electrolyte salts (predominantly potassium chloride) (each of the β-sulfatoethylsulfonyl groups can also be attached in the other ortho-position relative to the amino group, but is more probably located in the position indicated in the above formula).

This compound according to the invention possesses very good fiber-reactive dyestuff properties ($\lambda_{max}$=610 nm). It dyes the materials mentioned in the description, especially cellulose fiber materials, such as cotton, using the procedures which are customary and known in the art for the application and fixation of fiber-reactive dyestuffs, in deep, clear reddish-tinged blue shades which have good fastness properties, such as, in particular, good fastness to light of the dry or moist dyeings, such as dyeings moistened with drinking water, good fastness to light under alkaline perspiration, fastness to chlorinated water, fastness to hypochlorites, fastness to alkaline perspiration, fastness to washing, even in the presence of perborates, fastness to wet storage and fastness to acid fading.

is then filtered off and the filtrate is concentrated by distilling off the solvent. The desired compound of the formula

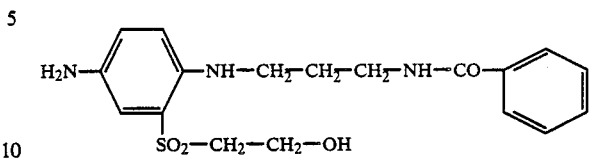

is obtained in the form of an oil.

(c) The 4-(γ-benzoylaminopropylamino)-3-(β-hydroxyethylsulfonyl)-aniline obtained from (b) is reacted analogously to the instructions of Examples 1(c) and 1(d) to give the triphendioxazine compound, which is then sulfonated in accordance with the instructions of Example 1(e) to give the triphendioxazine compound according to the invention

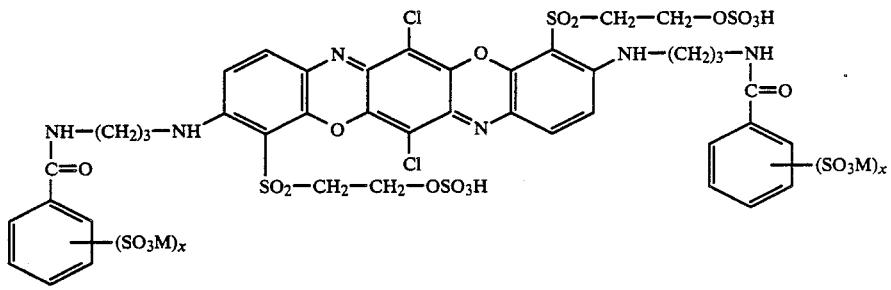

(in which x is intended to indicate a degree of sulfonation of approx. 1.2).

This compound according to the invention possesses very good fiber-reactive dyestuff properties ($\lambda_{max}$=606 nm). It dyes the materials mentioned in the description, in particular cellulose fiber materials, such as cotton, using the procedures which are customary and known in the art for the application and fixation of fiber-reactive dyestuffs, in deep, clear reddish-tinged blue shades having good fastness properties, such as, in particular, good fastness to light of the dry or moist dyeings, such as dyeings moistened with drinking water, good fastness to light under alkaline perspiration, fastness to chlorinated water, fastness to hypochlorite, fastness to alkaline perspiration, fastness to washing, even in the presence of perborates, fastness to wet storage and fastness to acid fading.

EXAMPLE 2

(a) 24 parts of triethylamine are added to a solution of 61 parts of 4-(γ-aminopropylamino)-3-(β-hydroxyethylsulfonyl)-nitrobenzene in 150 parts of N-methyl-2-pyrrolidone, followed by 31 parts of benzoyl chloride added continuously, in the course of which the reaction temperature rises to 45° C. The mixture is stirred for a further 3 hours and is then stirred onto 1,000 parts of ice water. After 2 hours the 4-(γ-benzoylaminopropylamino)-3-(β-hydroxyethylsulfonyl)-nitrobenze which is obtained in a pure state and in a high yield, is filtered off with suction and dried; it has a melting point of 140°-142° C. and exhibits the following data in its $^1$H-NMR spectrum: δ=1.87 ppm (m,2H); 3.38 ppm (m,2H); 3.48 ppm (m,2H); 3.58 ppm (m,2H); 3.77 ppm (m,2H); 4.92 ppm (s,OH); 7.04 ppm (d,1H); 7.37 ppm (t,NH); 7.45 ppm (m,2H); 7.51 ppm (m,1H); 7.86 ppm (m,2H); 8.25 ppm (dd,1H); 8.45 ppm (d,1H); 8.57 ppm (t,NH).

(b) 50 parts of the nitro compound obtained under (a) are dissolved in 250 parts of ethanol and are hydrogenated in the presence of a nickel catalyst in an autoclave at a temperature of up to 70° C. and a pressure of 50 bar. The hydrogenation takes about four hours. The catalyst

EXAMPLES 3 to 17

The Tabular Examples below describe further triphendioxazine compounds according to the invention by means of the formula members of the general formula (A)

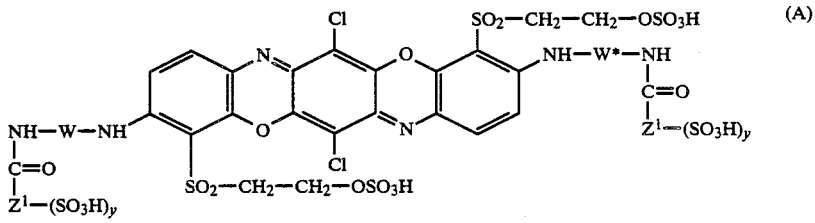

in which W represents the radical in the Table for W* written in a "mirror image" manner and in which the position of the sulfo-substitution in $Z^1$ is undetermined, but could be deduced approximately from the substitution rules. These compounds according to the invention can be prepared in a manner according to the invention, for example analogously to the above Working Examples, from the manifest components (chloranil, a compound of the general formula (5a) below and sulfuric acid/oleum).

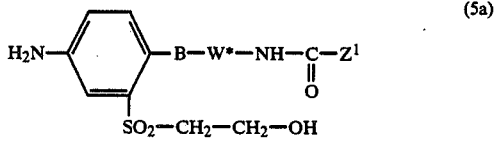

(5a)

The triphendioxazine compounds according to the invention also possess very good fiber-reactive dyestuff properties and afford, especially on cellulose fiber materials, deeply colored dyeings and prints which have good fastness properties in the color shade indicated in the particular Tabular Example.

ued at room temperature for 6 hours. The precipitated product is filtered off with suction and dried.

The desired 4-[β-(N'-phenylureido)-ethylamino]-3-(β-hydroxyethylsulfonyl)-nitrobenzene has a melting point of 157°–158° C. and exhibits the following $^1$H-NMR data: δ=3.35 ppm (m,2H); 3.47 ppm (m,4H); 3.70 ppm (m,2H); 4.85 ppm (t,OH); 6.34 ppm (t,1H); 6.87 ppm (m,1H); 7.10 ppm (d,1H); 7.20 ppm (m,2H); 7.32 ppm (t,NH); 7.38 ppm (m,2H); 8.22 ppm (dd,1H); 8.40 ppm (d,1H); 8.56 ppm (s,NH).

(b) 40 parts of the nitro compound from (a) are dissolved in 200 parts of methanol and are hydrogenated in the presence of a nickel catalyst in an autoclave at a temperature of up to 80° C. and a pressure of 50 bar. When the hydrogenation is complete, the catalyst is filtered off and the filtrate is concentrated by evaporating the solvent. The amino compound of the formula

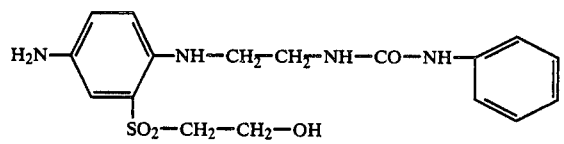

is obtained in a solid form and has a melting point of 139°–143° C. and gives the following $^1$H-NMR data: δ=3.18 ppm (m,2H); 3.30 ppm (m,2H); 3.35 ppm (m,2H); 3.63 ppm (m,2H); 4.77 ppm (s,NH$_2$); 4.85 ppm (s,OH); 5.48 ppm (t,NH); 6.28 ppm (t,NH); 6.77 ppm (d,1H); 6.85 ppm (dd,1H); 6.90 ppm (t,1H); 6.94 ppm

| Example | Radical —W*— | Radical —Z | y | Color shade |
|---|---|---|---|---|
| 3 | —CH$_2$—CH—<br>\|<br>CH$_3$ | Phenyl | about 1.2 | Reddish-tinged blue (610 nm) |
| 4 | 1,2-ethylene | 4-methylphenyl | about 1.1 | Reddish-tinged blue (612 nm) |
| 5 | 1,3-propylene | 4-chlorophenyl | about 1.1 | Reddish-tinged blue |
| 6 | 1,3-propylene | 4-methoxyphenyl | about 1.1 | Reddish-tinged blue |
| 7 | 1,2-ethylene | " | about 1.1 | Reddish-tinged blue |
| 8 | 2-methyl-1,3-propylene | " | about 1.1 | Reddish-tinged blue |
| 9 | —(CH$_2$)$_2$—O—(CH$_2$)$_2$— | " | about 1.1 | Reddish-tinged blue |
| 10 | —(CH$_2$)$_2$—SO$_2$—(CH$_2$)$_2$— | " | about 1.1 | Reddish-tinged blue |
| 11 | 2-methyl-1,3-propylene | 4-chlorophenyl | about 1.1 | Reddish-tinged blue |
| 12 | —(CH$_2$)$_2$—N—(CH$_2$)$_2$<br>\|<br>CH$_3$ | " | about 1.1 | Reddish-tinged blue |
| 13 | 1,2-dimethyl-1,2-ethylene | " | about 1.1 | Reddish-tinged blue |
| 14 | 1,2-dimethyl-1,2-ethylene | 4-methoxyphenyl | about 1.1 | Reddish-tinged blue |
| 15 | 1,2-dimethyl-1,2-ethylene | Phenyl | about 1.2 | Reddish-tinged blue |
| 16 | 1,2-ethylene | 2-methoxyphenyl | about 1.2 | Reddish-tinged blue |
| 17 | 1,2-ethylene | 1-naphthyl | about 2 | Reddish-tinged blue |
| 18 | 1,2-ethylene | 2-methylphenyl | about 1.2 | Reddish-tinged blue |

EXAMPLE 19

(a) 58 parts of 4-(β-aminoethylamino)-3-(β-hydroxyethylsulfonyl)-nitrobenzene are stirred into 200 parts of acetone; a solution of 26 parts of phenyl isocyanate in 30 parts of acetone is added slowly and continuously, in the course of 20 minutes, with stirring and at a temperature between 10° and 15° C., and stirring is then contin- (d,1H); 7.22 ppm (t,2H); 7.40 ppm (d,2H); 8.50 ppm (s,NH).

(c) A mixture of 15.3 parts of the aniline compound from (b), 0.8 part of magnesium oxide and 5.2 parts of chloranil in 150 parts of ethanol is heated at 40° C. for 5 hours. The resulting precipitated product is filtered off with suction, the residue on the filter is stirred into 150 parts of water and again filtered off with suction and dried under reduced pressure at 80° C.

9.3 parts of this condensation product are introduced into 95 parts of 10% strength oleum at 20° C., in the course of 15 minutes and with stirring; stirring is continued until the product is completely dissolved. 4.7 parts of sodium peroxodisulfate are then added slowly at such a rate that the temperature of the mixture does not exceed 25° C. The mixture is stirred for another hour and then poured onto ice and the pH of this suspension is adjusted to a value between 1 and 1.5 with calcium cabonate, and sodium carbonate is then added until the pH is adjusted to a value of 5.5; the calcium sulfate is filtered off with suction and washed with water, and the filtrates are combined. The compound according to the invention can be isolated from the filtrate by evaporation or spray-drying.

The sodium salt of the compound of the formula

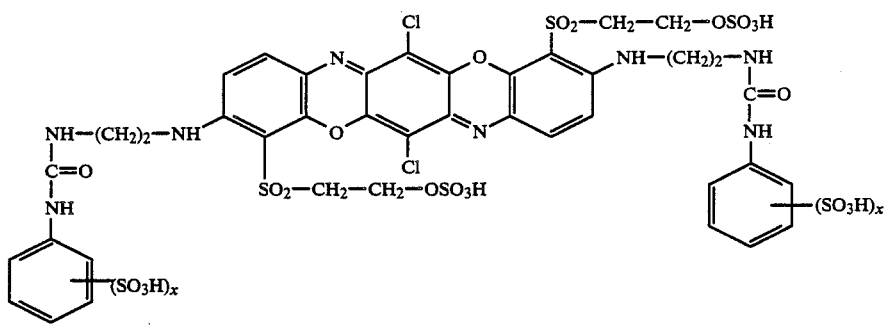

(in which x is intended to indicate a degree of sulfonation of approx. 1.2) is obtained in the form of a powder containing electrolyte salts (predominantly sodium sulfate) (each of the β-sulfatoethylsulfonyl groups can also be attached in the other ortho-position relative to the amino group, but is more probably located in the position indicated in the above formula).

This compound according to the invention possesses very good fiber-reactive dyestuff properties ($\lambda_{max}=623$ nm). It dyes the materials mentioned in the description, in particular cellulose fiber materials, such as cotton, using the procedures which are customary and known in the art for the application and fixation of fiber-reactive dyestuffs, in deep, clear blue shades having good fastness properties, such as, in particular, good fastness to light of the dry or moist dyeings, such as dyeings moistened with drinking water, good fastness to light under alkaline perspiration, fastness to chlorinated water, fastness to hypochlorites, fastness to alkaline perspiration, fastness to washing, even in the presence of perborates, fastness to wet storage and fastness to acid fading.

EXAMPLES 20 to 37

The Tabular Examples below describe further triphendioxazine compounds according to the invention by means of structural elements of the general formula (B)

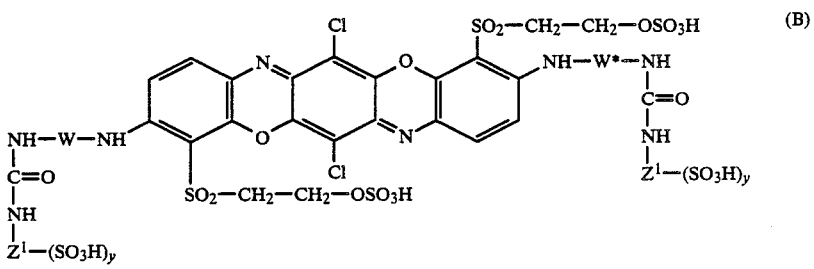

in which W represents the radical in the Table for W* written in a "mirror image" manner and in which the position of the sulfo-substitution in $Z^1$ is undetermined, but could be deduced approximately from the substitution rules. These compounds according to the invention can be prepared in a manner according to the invention, for example analogously to the above Working Examples, from the manifest components (chloranil, a compound of the general formula (5b) below and sulfuric acid/oleum).

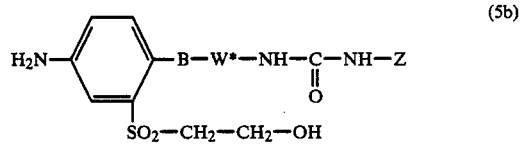

These triphendioxazine compounds according to the invention also possess very good fiber-reactive dyestuff properties and afford, in particular on cellulose fiber materials, deeply colored dyeings and prints which have good fastness properties, in the color shade indicated in the particular Tabular Example.

| Example | Radical —W*— | Radical —Z | y | Color shade |
|---|---|---|---|---|
| 20 | 1,3-propylene | Phenyl | about 1.2 | Blue (615 nm) |
| 21 | —CH$_2$—CH(CH$_3$)— | Phenyl | about 1.2 | Blue (620 nm) |
| 22 | —(CH$_2$)$_2$—O—(CH$_2$)$_2$— | Phenyl | about 1.2 | Blue |
| 23 | 1,2-ethylene | 3-methylphenyl | about 1.1 | Blue |
| 24 | 1,3-propylene | " | about 1.1 | Blue |
| 25 | —CH$_2$—CH(CH$_3$)— | " | about 1.1 | Blue |
| 26 | 1,2-ethylene | 2-methylphenyl | about 1.1 | Blue |
| 27 | 1,3-propylene | " | about 1.1 | Blue |
| 28 | —(CH$_2$)$_2$—SO$_2$—(CH$_2$)$_2$— | Phenyl | about 1.2 | Blue |
| 29 | —(CH$_2$)$_2$—SO$_2$—(CH$_2$)$_2$— | 3-methylphenyl | about 1.1 | Blue |
| 30 | 1,2-ethylene | 2-chlorophenyl | about 1.2 | Blue |
| 31 | 1,3-propylene | 2,3-dichlorophenyl | 1 | Blue |
| 32 | 1,2-ethylene | 3,5-dimethylphenyl | 1 | Blue |
| 33 | 2-methyl-1,3-propylene | " | 1 | Blue |
| 34 | 1,2-ethylene | 1-naphthyl | about 2 | Blue |
| 35 | 1,3-propylene | " | about 2 | Blue |
| 36 | 1,2-ethylene | 4-chlorophenyl | about 1.2 | Blue |
| 37 | 1,3-propylene | " | about 1.2 | Blue |

We claim:

1. A water-soluble triphendioxazine compound corresponding to the formula

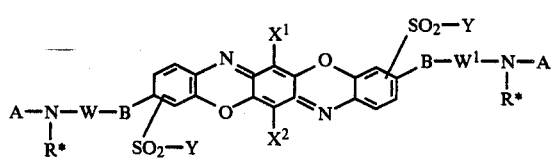

in which:

B is an oxygen or sulfur or is an amino group of the formula —NH— or —N(R')—, in which R' is alkyl of 1 to 6 carbon atoms;

R* is hydrogen or alkyl of 1 to 4 carbon atoms unsubstituted or substituted by one or two substituents selected from the group consisting of: chlorine, alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms or phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl; and naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms or phenyl or alkyl of 1 to 4 carbon atoms and phenyl; or R* is phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms or phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl, or R* is naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl, unsubstituted or monosubstituted or disubstituted by alkyl of 1 to 4 carbon atoms or phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl;

W is a bivalent group selected from an aliphatic group or a ($C_5$–$C_{10}$)-cycloaliphatic group unsubstituted or substituted by $C_1$–$C_4$-alkyl, or from an aliphatic-($C_5$–$C_8$)-cycloaliphatic group unsubstituted or substituted by $C_1$–$C_4$-alkyl in the cycloaliphatic moiety and unsubstituted or substituted in the aliphatic moiety by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms or phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl;

or from those groups which aliphatic radicals are interrupted by hetero groups which are selected from the groups —O—, —S—, —SO$_2$—, —CO—, 1,4—piperidino, —NH— and —N(-R$^o$)—, wherein R$^o$ has one of the meanings of R' or is an alkanoyl of 2 to 5 carbon atoms, and W$^1$ has one of the meanings indicated for W and is identical to or different from W, or the grouping —B—W$^1$—N(R*)— and the grouping —N(R*)—W—B—, identical to or different from each other, each represent together a bivalent five- or six-membered saturated heterocylic group which contains two nitrogen atoms, or the grouping —B—W$^1$— and the grouping —W—B—, identical to or different from each other, each represent together a bivalent five- or six-membered saturated heterocylic group which contains two nitrogen atoms and which is bonded by one of the two nitrogen atoms via an alkylene group of 2 to 4 carbon atoms to the grouping —N(R*)—A— or —A—N(R*)—;

A is a group of the formula

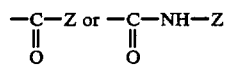

in which Z is phenyl or naphthyl both of which are substituted by substituents selected from alkyl of 1 to 4 carbon atoms, alkoxy of 1 to 4 carbon atoms, chlorine, bromine, nitro, carbalkoxy of 2 to 5 carbon atoms, sulfo and carboxy, at least one of these substituents being sulfo or carboxy;

X$^1$ is hydrogen, halogen, alkyl of 1 to 4 carbon atoms, alkoxy of 1 to 4 carbon atoms, or phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl and carbamoyl;

X$^2$ is identical to or different from X$^1$ and has one of the meanings indicated for X$^1$;

Y is vinyl, or is an ethyl substituted in the β-position by an alkali-eliminable substituent;

said compound containing at least two sulfo groups selected from the sulfo substituents mentioned above.

2. A compound according to claim 1, wherein Z is phenyl substituted by substituents selected from the group consisting of alkyl of 1 to 4 carbon atoms, alkoxy of 1 to 4 carbon atoms, chlorine, bromine, nitro, carbalkoxy of 2 to 5 carbon atoms, sulfo and carboxy, at least one of these substituents being sulfo or carboxy.

3. A compound according to claim 1, wherein Z is a group of the formula

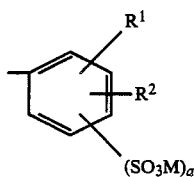

in which
M is hydrogen or an alkali metal or an alkaline earth metal,
R$^1$ is hydrogen, alkyl of 1 to 4 carbon atoms, alkoxy of 1 to 4 carbon atoms, chlorine, bromine, nitro, carbalkoxy of 2 to 5 carbon atoms or sulfo, R$^2$ is hydrogen, alkyl of 1 to 4 carbon atoms, alkoxy of 1 to 4 carbon atoms, chlorine, carboxy or sulfo,
a is zero or 1, but with the proviso that a is 1 if R$^1$ or R$^2$ is another substituent than sulfo or carboxy.

4. A compound according to claim 1, wherein Z is a group of the formula

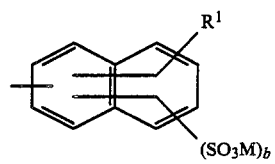

in which
M is hydrogen or an alkali metal or an alkaline earth metal,
R$^1$ is hydrogen, alkyl of 1 to 4 carbon atoms, alkoxy of 1 to 4 carbon atoms, chlorine, bromine, nitro, carbalkoxy of 2 to 5 carbon atoms or sulfo,
b is zero, 1 or 2, but with the proviso that b is 1 or 2 if R$^1$ is another substituent than sulfo.

5. A compound according to claim 3, wherein R$^1$ is hydrogen, methyl, ethyl, methoxy, ethoxy, sulfo, chlorine or bromine and R$^2$ is hydrogen, methoxy, ethoxy, carboxy or sulfo, and a is 1.

6. A compound according to claim 4, wherein R$^1$ is hydrogen, and b is 1 or 2.

7. A compound according to claim 1, wherein W and W$^1$, being identical with one another or differnt from one another, each is alkylene of 2 to 6 carbon atoms or alkylene of 2 to 6 carbon atoms interrupted by an oxygen or a group —NH—, or each is cycloalkylene of 5 or 6 carbon atoms unsubstituted or substituted by 1, 2 or 3 methyl groups, or is cycloalkylene-alkylene-cycloalkylene the cycloalkylene moieties of which being of 5 or 6 carbon atoms and being unsubstituted or substituted by 1, 2 or 3 methyl groups and the alkylene moiety of which being of 1 to 4 carbon atoms, or each is alkylene of 2 to 6 carbon atoms interrupted by a cycloalkylene of 5 or 6 carbon atoms which is unsubstituted or substituted by 1, 2 or 3 methyl groups.

8. A compound according to claim 1, wherein W and W$^1$ each is 1,2-ethylene, 1,3-propylene, 1,4-butylene or isopropylene.

9. A compound according to claim 2, wherein W and W$^1$ each is 1,2-ethylene, 1,3-propylene, 1,4-butylene or isopropylene.

10. A compound according to claim 3, wherein W and W$^1$ each is 1,2-ethylene, 1,3-propylene, 1,4-butylene or isopropylene.

11. A compound according to claim 4, wherein W and W$^1$ each is 1,2-ethylene, 1,3-propylene, 1,4-butylene or isopropylene.

12. A compound according to claim 7, wherein W and W$^1$ each is 1,2-ethylene, 1,3-propylene, 1,4-butylene or isopropylene.

13. A compound according to claim 1, wherein each Y is β-sulfatoethyl.

14. A compound according to claim 1, wherein X$^1$ and X$^2$ are each chlorine or bromine.

15. A compound according to claim 1, wherein X$^1$ and X$^2$ are both chlorine.

16. A compound according to claim 1, of the formula

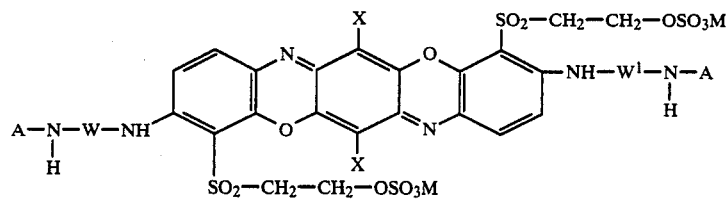

in which
 W and $W^1$ each is alkylene of 2 to 6 carbon atoms,
 X is bromine or chlorine,
 M is hydrogen or an alkali metal, and
 A is each a group of the formula —CO—Z or —CO—NH—Z in which each Z, identical with one another or different from one another, is a group of the formula

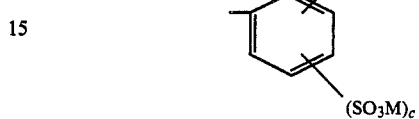

in which
 $R^3$ is methyl, ethyl, methoxy, ethoxy, sulfo, chlorine or bromine and
 c is zero, 1 or 2, but with the proviso that c is 1 or 2 if $R^3$ is another substituent than sulfo.

17. A compound according to claim 16, wherein both X are chlorine.

18. A compound according to claim 1, in which the group —$SO_2$—Y is bonded in the ortho-position relative to the group —B—W—N(R*)—A and A—N(R*)—W—B, respectively.

* * * * *